United States Patent [19]

Kafri

[11] Patent Number: 5,751,814
[45] Date of Patent: May 12, 1998

[54] FILE ENCRYPTION METHOD

[75] Inventor: Oded Kafri, Beer Sheva, Israel

[73] Assignee: Veritas Technology Solutions Ltd., Beer Sheva, Israel

[21] Appl. No.: 672,324

[22] Filed: Jun. 25, 1996

[30] Foreign Application Priority Data

Jun. 27, 1995 [IL] Israel ......................... 114361

[51] Int. Cl.$^6$ ........................................ H04L 9/00
[52] U.S. Cl. ...................... 380/49; 380/4; 380/9; 380/21; 380/23; 380/25; 380/50
[58] Field of Search ........................ 380/9, 21, 23, 380/25, 28, 29, 37, 49, 50, 43, 4, 30

[56] References Cited

U.S. PATENT DOCUMENTS 5,239,648 8/1993 Nukui ......................... 380/4 X
5,584,023 12/1996 Hsu ......................... 380/4 X
5,604,803 2/1997 Aziz ......................... 380/25

Primary Examiner—Bernarr E. Gregory
Attorney, Agent, or Firm—Darby & Darby

[57] ABSTRACT

A file encryption method is provided which includes the steps of encrypting the text of the message to be sent, concatenating the encrypted text together with a password to the end of a decryption application to produce a combined file and converting the combined file to an electronic mail format. The file encryption method further includes the steps of transmitting and receiving the converted combined file, reconverting the converted combined file to its previous format and executing the combined file thereby to operate the decryption application on the encrypted text and thereby to produce the text of the message.

9 Claims, 2 Drawing Sheets

FILE ENCRYPTION METHOD

FIELD OF THE INVENTION

The present invention relates to file encryption systems and methods and to file transmissions systems and methods generally.

BACKGROUND OF THE INVENTION

Computer files which are large are often compressed, using one of many compression techniques, such as that provided in the PKZIP application, commercially available from PKWARE of the U.S.A. The large files can be bitmap images, the files of a large computer program, or any file, or series of files, that a user wants to archive. In particular, compression is utilized when preparing the installation process for a new computer program. Often, the installation process will include the decompression program therein, either as part of the compressed files or separate therefrom.

Files to be transmitted through a computer network, such as the Internet, are often compressed to reduce the amount of data to be transmitted. However, for networks of many computers, the transmitted files pass through, and can be temporarily stored, in a portion of the computers of the network, on their way to their destination. The transmitted files are thus relatively easily available to pirates who want to view them. Since most people have decompression programs, the fact that a file is compressed will not keep it from prying eyes.

SUMMARY OF THE PRESENT INVENTION

It is therefore an object of the present invention to provide a method of encrypted transmission.

In accordance with a preferred embodiment of the present invention, the method includes the steps of:

a) encrypting the text of the message to be sent;

b) concatenating the encrypted text and a password to the end of a decryption application to produce a combined file;

c) converting the combined file to an electronic mail format;

d) transmitting and receiving the converted combined file;

e) reconverting the converted combined file to its previous format; and f) executing the combined file thereby to operate the decryption application on the encrypted text and thereby to produce the text of the message.

For transferring files, the method is similar but does not include the encoding and decoding required for email messages. The second method of the present invention includes the following steps:

a) encrypting the file to be sent;

b) concatenating the encrypted file and a password to the end of a decryption application to produce a combined file;

c) placing the combined file in a known location on a network;

d) accessing the combined file from the known location;

e) executing the combined file thereby to operate the decryption application on the encrypted file and thereby to produce the file.

Additionally, in accordance with a preferred embodiment of the present invention, the password is a representation of a password provided by a sender. Furthermore, the step of executing includes the steps of a) receiving a password provided by a receiving party, b) comparing the password of the receiving party to that stored in the combined file and c) operating the decryption algorithm only if the two passwords match.

Moreover, in accordance with a preferred embodiment of the present invention, the step of concatenating includes the step of receiving sender information and storing that information in the combined file and the step of executing includes the step of displaying information about the sender of the message.

Finally, in accordance with a preferred embodiment of the present invention, the combined file additionally includes opening instructions provided in a non-encoded format.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

The present invention is a method of transmitting and receiving encrypted messages through public networks such as the Internet. In the present invention, the message to be sent is encrypted with an encryption application and prepared for sending through the network. On the receiving side, the encrypted message is received as a message and the receiver only has to execute the encrypted message. If the receiver knows the password associated with the encrypted message, the message will be decrypted.

Figure 1:
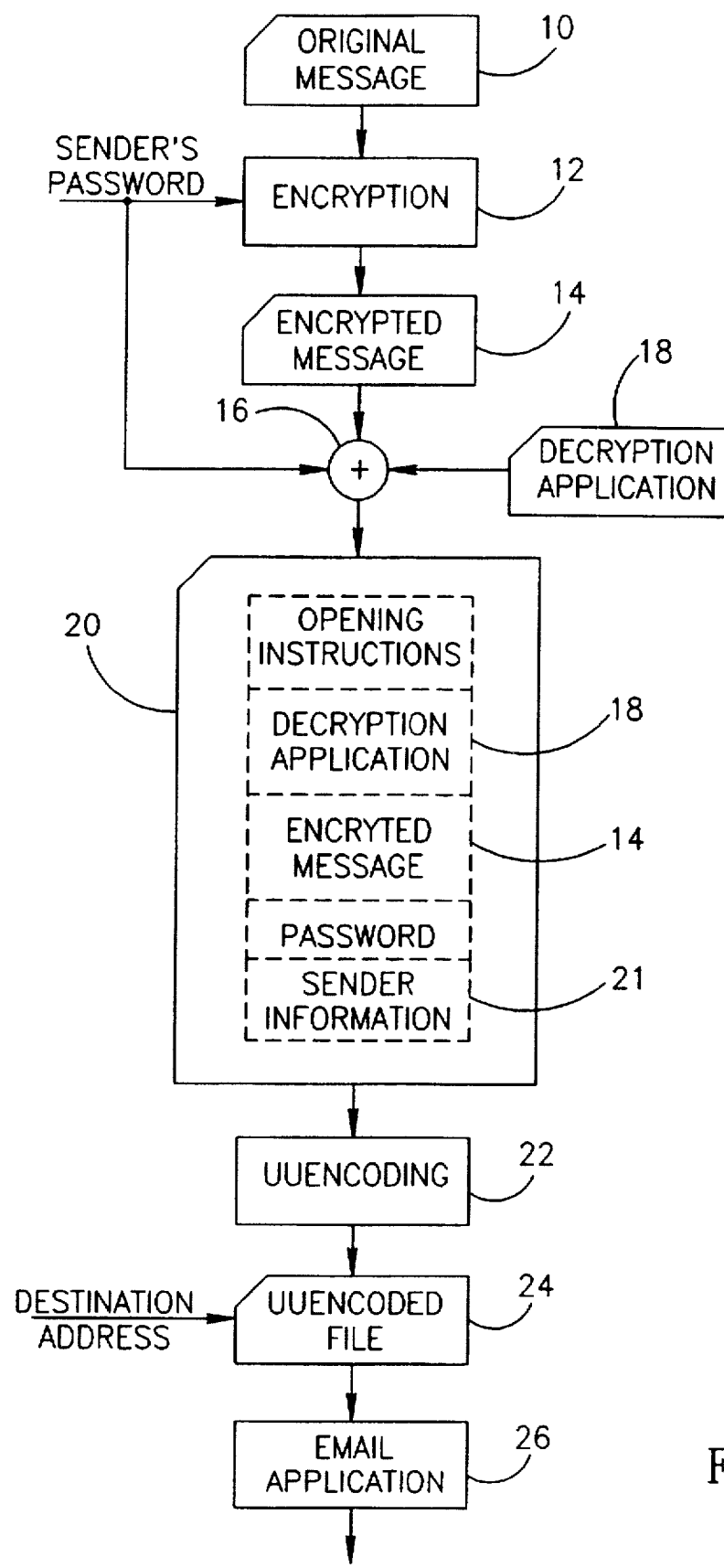
FIG. 1 is a flow chart illustration of the transmission method of the present invention.
Figure 2:
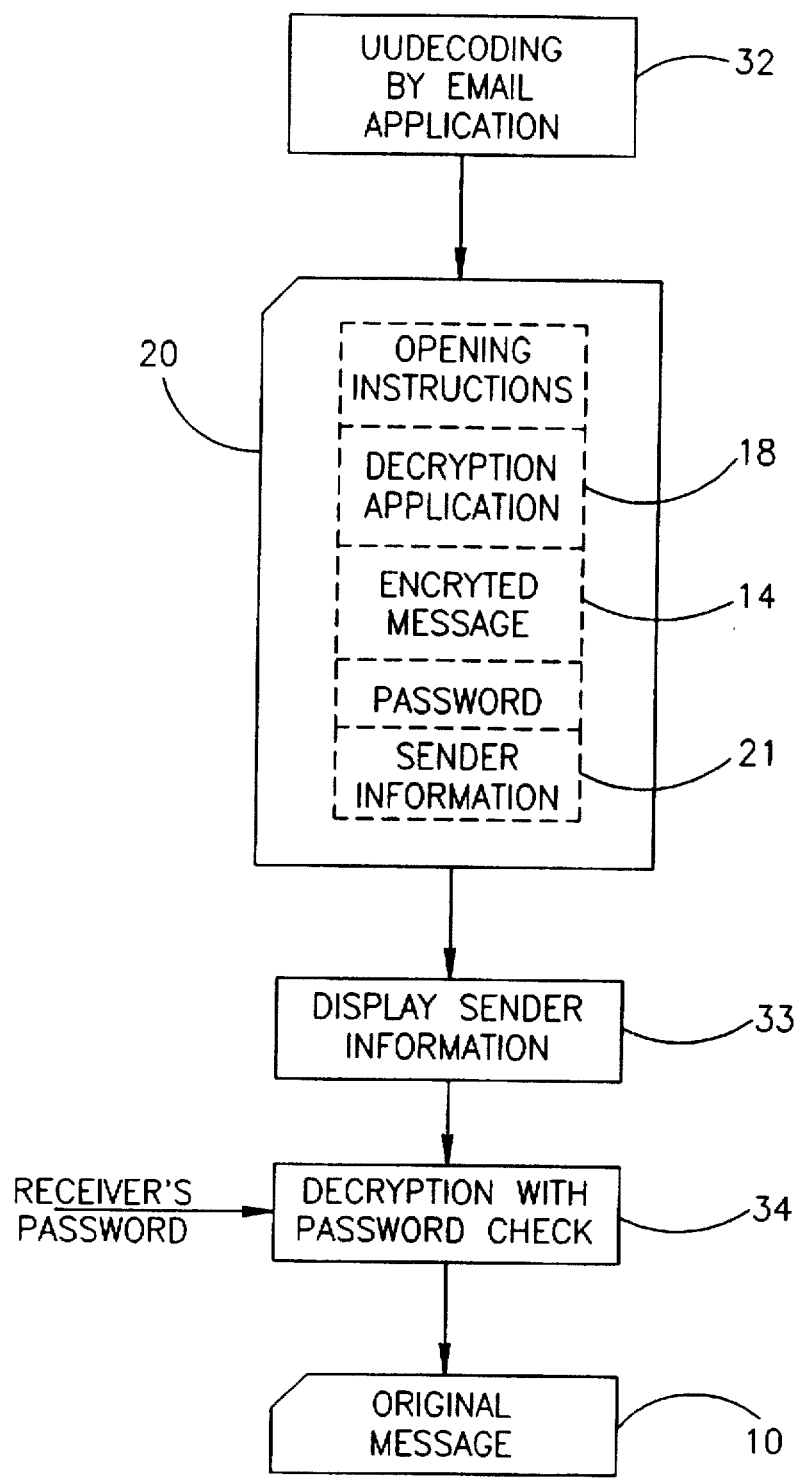
FIG. 2 is a flow chart illustration of the reception method of the present invention.

Reference is now made to FIGS. 1 and 2 which illustrate the method of the present invention for sending electronic mail (email) messages. In FIGS. 1 and 2, the operations are marked by rectangles and the input and output files are marked by five sided polygons.

The text of a message 10 to be sent is encrypted, in step 12, in accordance with any suitable encryption technique, such as the data encryption standard (DES), the Rivest, Shamir and Adelman (RSA) algorithm, etc. The encryption technique operates in conjunction with a password provided by the sender. Step 12 produces an encrypted message 14.

In step 16, the encrypted message 14 is concatenated onto a decryption application 18 which corresponds to the encryption technique of step 12 to produce a combined file 20. Typically, step 16 provides the decryption algorithm 18 with the start and end addresses, within the combined file 20, of the encrypted message 14. Step 16 also stores the password, or some representation thereof such as a signature, in the combined file 20. It can additionally store information 21 about the sender, such as his name, his email address, his real address, etc., within the combined file 20. Finally, step 16 places instructions of how to open and execute the combined file, in a visible text, into the combined file.

In step 22, the combined file 22, a typically binary file, is encoded to ensure generally complete transmission via the public network. For example, and as shown in FIG. 1, file 22 is "uuencoded" which produces a printable representation of the binary file.

The uuencoded file 24 is then provided to an email application 26 which receives the destination address, and knows the sender's address (or receives it also), and transmits the uuencoded file 24 via the network in accordance with the email protocols. The email application 26 can be any suitable application, such as CHAMELEON, commercially available from NETMANAGE of the U.S.A. If the method of the present invention is implemented in the WINDOWS operating system environment, the uunencoded file 24 can be transferred to the email application 26 via the CLIPBOARD.

At the destination address, the transmitted data is first "uudecoded" (step 32, FIG. 2) by an email application. The email application can be the same as application 26 or a different one which also has uudecoding capabilities. Step 32 produces the combined file 20 which is displayed by the email application as a message, denoting the sender and his address and displaying the opening instructions.

The receiver then has to "run" or "execute" the combined file 20 (steps 33 and 34), typically outside of the email application. The decryption application 18 within the combined file 20 first displays (step 33) the sender information 21 and then asks the receiver for the password. The password provided by the receiver is then compared to the sender's password, or representation thereof, stored within the combined file 20. If they are the same, the decryption application 18 decrypts the encrypted message 14 with the receiver's password to produce the original message 10. Otherwise, no decryption occurs. If the receiver provided a password whose signature is the same as that of the sender's password but the password is different (i.e. the two passwords have the same checksum but are different words), the decryption application 18 will decrypt the message but will produce a scrambled message.

It will be appreciated that the present invention enables a sender to send encrypted messages to a receiver without requiring that the receiver have the decryption application. Furthermore, the present invention enables messages to be encrypted and sent via email on the Internet.

It will further be appreciated that the present invention can be implemented for encrypting files to be transmitted through the Internet. In this embodiment, the data which is encrypted is a file, rather than a message, and the uuencoding and email transmission operations (steps 22 and 26) are not performed. Instead, the combined file 20 is placed in an file transfer protocol (FTP) box where it is accessible to all. However, only those who know the password will successfully be able to decrypt the file. The receiving party only has to execute the combined file 20 with the correct password (i.e. perform step 34).

It will be appreciated by persons skilled in the art that the present invention is not limited to what has been particularly shown and described hereinabove. Rather the scope of the present invention is defined by the claims which follow:

I claim:

1. A method for transmitting and receiving encrypted messages, the method comprising the steps of:

a. encrypting the text of the message to be sent;
   b. concatenating the encrypted text and a password to the end of a decryption application to produce a combined file;
   c. converting the combined file to an electronic mail format;
   d. transmitting and receiving the converted combined file;
   e. reconverting the converted combined file to its previous format; and
   f. executing the combined file thereby to operate the decryption application on the encrypted text and thereby to produce the text of the message.

2. A method according to claim 1 and wherein said password is a representation of a password provided by a sender.

3. A method according to claim 1 and wherein said step of executing comprises the steps of receiving a password provided by a receiving party, comparing the password of said receiving party to that stored in said combined file and operating said decryption algorithm only if the two passwords match.

4. A method according to claim 1 and wherein said step of concatenating comprises the step of receiving sender information and the step of executing comprises the step of displaying said sender information.

5. A method according to claim 1 and wherein said combined file additionally comprises opening instructions provided in a non-encoded format.

6. A method for transmitting and receiving encrypted file, the method comprising the steps of:

a. encrypting the file to be sent;
   b. concatenating the encrypted file and a password to the end of a decryption application to produce a combined file;
   c. placing said combined file in a known location on a network;
   d. accessing said combined file from said known location;
   e. executing the combined file thereby to operate the decryption application on the encrypted file and thereby to produce the file.

7. A method according to claim 6 and wherein said step of executing comprises the steps of receiving a password provided by a receiving party, comparing the password of said receiving party to that stored in said combined file and operating said decryption algorithm only if the two passwords match.

8. A method according to claim 6 and wherein said step of executing comprises the step of receiving sender information and the step of executing comprises the step of displaying said sender information.

9. A method according to claim 6 and wherein said combined file additionally comprises opening instructions provided in a non-encoded format.

* * * * *